May 19, 1970     E. K. CLELAND     3,512,756
PRESSURIZABLE ELASTOMERIC THRUSTING DEVICE
Filed Sept. 5, 1967
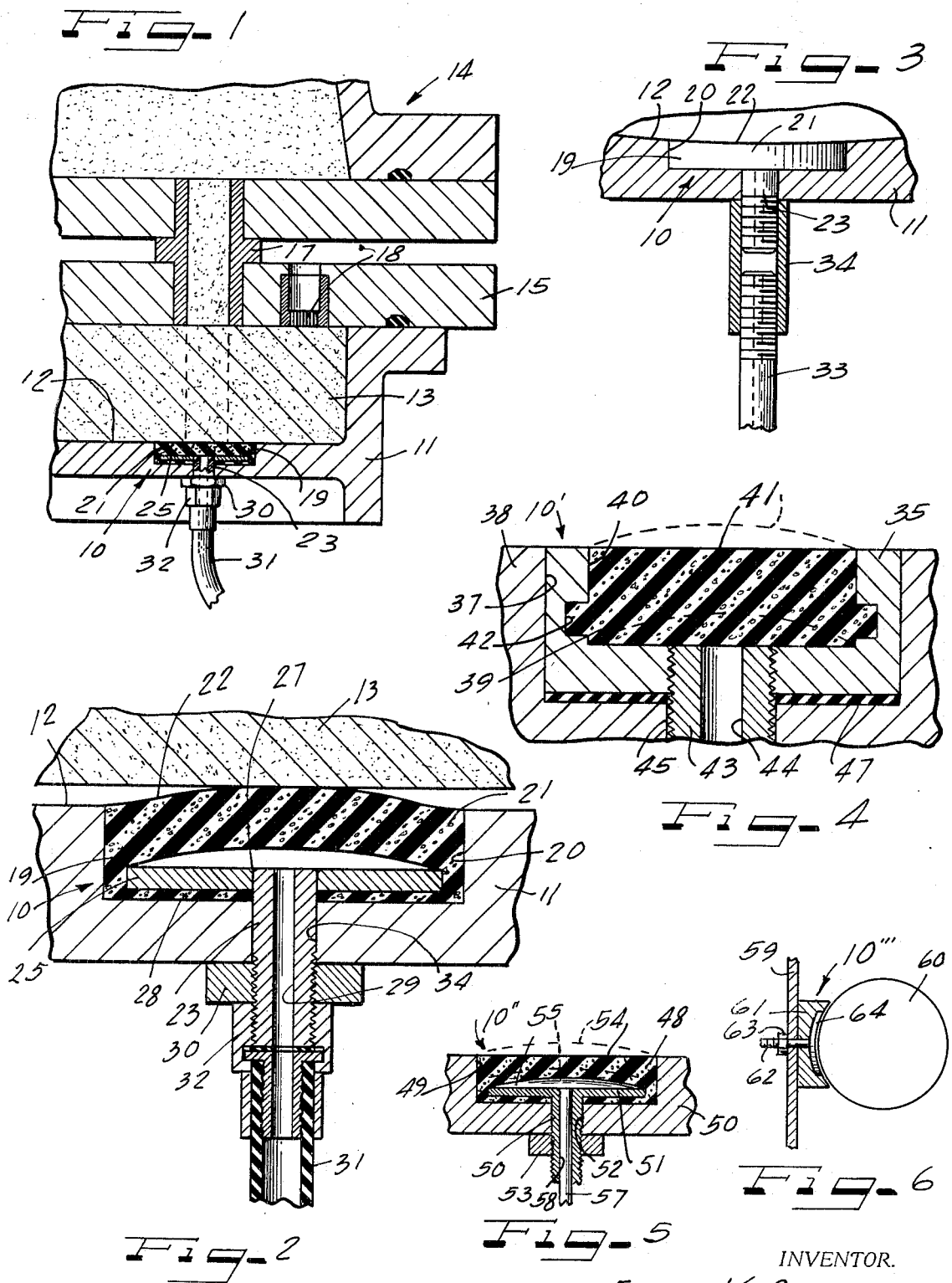
INVENTOR.
ERNIE K. CLELAND United States Patent Office 3,512,756
Patented May 19, 1970

1

3,512,756
PRESSURIZABLE ELASTOMERIC THRUSTING DEVICE
Ernie K. Cleland, Milwaukee, Wis., assignor to Dike-O-Seal Incorporated, Chicago, Ill., a corporation of Illinois
Filed Sept. 5, 1967, Ser. No. 665,391
Int. Cl. B22c 15/22; B66f 3/24
U.S. Cl. 254—93
14 Claims

ABSTRACT OF THE DISCLOSURE

An elastomeric body which substantially fills a recess in a supporting member provides a head thrustable out of a normal plane to impart motion to or restain motion of a confronting relatively movable member.

This invention relates to novel pressurizable elastomeric thrusting devices, and more particularly concerns such devices especially adapted for imparting relative motion to or restraining relative motion of confronting members.

Numerous and varied mechanical devices employing cams, linkages, levers, rigid plungers, and the like, have heretofore been employed to impart relative motion to or to restrain relative motion of confronting members. A typical example of imparting motion is that of effecting relative separation of confronting members, such as is effected by ejectors. A typical example of restraining of motion of confronting members is that effected by brakes.

In addition to the mechanical complexities, wear of relatively moving parts, excessive space requirements, damage to delicate contact surfaces, and other disadvantages, relatively high installation costs and service and repair problems, as well as restricted adaptability are inherent in prior constructions.

An important object of the present invention is to provide a new and improved pressurizable elastomeric thrusting device.

Another object of the invention is to provide a self-returning elastomeric thrusting device.

A further object of the invention is to provide a novel elastomeric thrusting device which is operable entirely by fluid pressure.

Still another object of the invention is to provide a novel pressurizable elastomeric thrusting device which is highly adaptable for various operating conditions and requirements, is of low unit cost, is easy to install, is easy to replace, is long lived in use and highly efficient in operation.

Yet another object of the invention is to provide a pressurizable elastomeric thrusting device which is operable against delicate surfaces without damaging the same.

A still further object of the invention is to provide a pressurizable elastomeric thrusting device which is adapted for multiple functions including ejection of parts from molding or other forming cavities, abrasion resistant protection and cushioning, relative motion restraint as in braking, and the like.

It is also an object of the invention to provide a new and improved pressurizable elastomeric thrusting device constructed as a readily and easily installable prefabricated unit.

Other objects, features and advantages of the present invention will be readily apparent from the following detailed description of certain preferred embodiments thereof taken in conjunction with the accompanying drawing, in which:

FIG. 1 is a fragmentary vertical sectional detail view through a sand molding core box and blowing head assembly in which the core box is equipped with a pressurizable elastomeric thrusting device according to the present invention;

FIG. 2 is a substantially enlarged fragmentary sectional detail view similar to FIG. 1 but emphasizing the details of structure of the elastomeric thrusting device and showing the same under thrusting pressurization;

FIG. 3 is a fragmentary vertical sectional detail view showing a modification;

FIG. 4 is a fragmentary vertical sectional view showing another modification;

FIG. 5 is a vertical sectional elevational detail view showing still another modification; and FIG. 6 is a schematic view illustrating use of the invention for restraining motion, and more particularly as a brake.

Although it will be readily apparent that numerous and varied uses of the thrusting device of the present invention will readily present themselves, by way of one practical example of use of the device for imparting motion is as an ejector. On reference to FIG. 1, a representative thrusting device 10 featuring the invention is mounted in a sand core box 11 of the type used in the foundry art for producing cores to be employed in casting metal parts. As shown, the core box 11 has a molding cavity 12 into which a sand core 13 is blown from the sand hopper of a magazine 14 of a sand core blowing machine. In blowing a core into the cavity 12, the core box 11 is placed in registration with a blow plate 15 and sand together with any desired binder material is driven through one or more blow tubes or bushings 17 into the core box cavity, air being displaced through suitable screened vents 18. Thereafter, setting of the core 13 into a reasonably solid member may be effected in any preferred manner and involving the bonding of the sand grains to one another.

Blowing of the sand into the core box cavity 12 occurs under substantial pressure and at substantial velocity with the stream of sand at least in the initial phase of blowing striking the surface of the core box defining the cavity 12 directly opposite the discharge end of the blow tube 17, substantially as indicated in dot dash outline in FIG. 1. Whereas heretofore means have been provided opposite the blow hole to prevent sand erosion, such means have had only the single function of preventing erosion. Herein the elastomeric thrusting device 10 is desirably located opposite the blow hole to serve as an erosion-preventing pad or cushion. Of course, if that location for the thrusting device 10 is not convenient or efficient for its thrusting, ejector action, it will be located differently. In a multi-part core box having a side piece which must be separated from the core, the thrusting device will be located on that piece. Where the core box is provided with a top, as is frequently done in this art, the thrusting or ejector device 10 will be located in the top. Thus, there is no limitation as to location of the device 10, nor is it intended that there be any limitation on the number of devices 10 that may be used in any particular installation to effect the desired ejector result, and erosion preventing function where that is desired.

In one desirable form, the device 10 comprises an elastomeric body 19 (FIGS. 1 and 2) of suitable thickness and area dimensions. For example, for use as ejectors or as combination erosion-preventing and ejector means, the devices 10 may be of generally button form with a diameter of about three-quarters of an inch for smaller sizes and of graduated larger sizes to meet requirements, although for most purposes a diameter of about one inch has been found suitable. For some purposes oval, oblong, rectangular or strip form arrangements of substantially greater length than width may be provided. Any suitable elastomer may be utilized in the body 19, possessed of a sufficiently low durometer for moderate stretching elasticity, but yet sufficiently form retaining to avoid unduly free plastic displacement under pressure to which subjected in use, and more particularly by variable pressures that may be exerted thereagainst by material, such as sand, in a fluent but pressurized condition. Thereby, when the body 19 is mounted in a complementary recess 20 in the wall of the core box 11 defining the cavity 12 and with a head portion 21 having its head plane surface 22 conforming to the plane of the wall surface, there is continuity of the molding surface and thus of the corresponding molded surface of the core 13. Suitable materials for the body 19 are multi-closed-cell rubber or synthetic resinous materials which are desirable where at least a certain degree of compressibility of the material itself is advantageous. Where compressibility of the material itself is not advantageous or where it may be more advantageous to employ a non-compressible though elastomeric material, a substantially non-cellular elastomeric material may be employed. Representative of materials that may be utilized are synthetic rubbers of the "Buna-N" type, neoprene, nylon, polyurethane, and the like. Where an especially abrasion-resistant material of the body itself or for the exposed head surface of the body is desired polytetrafluorethylene may be used.

Although the body 19 of the device may be molded and cured in situ, an advantageous arrangement comprises preforming the body 19 and supplying the device 10 as a ready made unit supplied to the core box maker or user, or others to be installed where and as needed. The user then need only provide in the supporting member, such as the core box 11, the complementary recess 20 and any communicating aperture that may be needed. Within the recess 20, the device 10 is then secured against displacement.

In the illustrated example, the device 10 is pressurizable by means of fluid pressure, either pneumatic or hydraulic. For this purpose, the device 10 comprises an assembly having the body 19 carried on a combination pressurizing passage stem and attaching means 23 which extends into the back of the body 19 and projects substantially therefrom to extend through a complementary bore 24 in the wall of the core box 11 and leading from the recess 20 to the outside. On its inner end portion, the stem 23 has a lateral flange 25 which is desirably of uniform extent thereabout where the body 19 is of a size for which one stem is adequate. Where the body 19 is of such a size, and more particularly length, as to warrant the use of more than one of the stems 23, location of the stems along the flange 25 is at spaced intervals. Although the stem 23 and the flange 25 may be constructed as a one piece unit, for purposes of economy it is desirable to construct them of separate units wherein the stem 23 is made from a piece of tubing or pipe stock while the flange 25 is made as an apertured stamping and the two parts assembled and permanently welded as at 27, thereby providing a functionally integral unit.

Within the body 19, the flange 25 occupies a position spaced further from the outer end surface 22 than the back face of the body such that the head portion 21 is substantially thicker than a base portion 28 of the body intervening between the back face of the flange 25 and the back face of the body and which portion 28 is adapted to be clamped sealingly against the bottom defining the recess 20. While the material of the body 19 is desirably bonded to the edge and backface of the flange 25 and to that portion of the stem 23 which projects from the backface of the flange, the front face of the flange 25 and the inner end of the stem 23 are maintained in freely separable relation with respect to the head portion 21 of the body. Thereby, although the body 19 normally contacts all confronting surfaces of the stem 23 and the flange 25, the head 21 is elastically separable relative to the flange 25 when separating pressure is applied, as by introduction of pressure fluid by way of an axial passage 29 throughout the length of the stem 23. Thus, after the core 17 has been solidified sufficiently to be handled, pressure fluid is introduced into the body 19 between the flange 25 and the head 21 which causes the head 21 to expand from the condition as shown in FIG. 1 out of the plane of the forming surface defining the cavity 12 to a projected position, as shown in FIG. 2, wherein the surface of the head confronting the flange 25 cavitates away therefrom and the crown of the head thrusts against the core 13 and at least partially ejects the core from the molding cavity. Because of the elastomeric nature of the material of the thrusting head 21 the ejection thrust is relatively gentle and with general conformance of the thrusting surface of the head with the relatively delicate skin surface of the core, especially at the beginning and generally greatest pressure of the thrust against the core where there is any tendency for the core to stick or resist dislodgement. Thereby damage to the core surface is avoided.

Securement of the device 10 is readily effected as by means of a nut 30 threaded onto the portion of the stem 23 which projects outwardly from the core box 11. Through this arrangement the flange 25 is drawn clampingly against the intervening body portion 28 which not only thoroughly anchors the body 19 in the recess 20 but seals the recess against leakage through the bore 24. This is especially desirable where cold curing of the core 13 is effected by a process utilizing a gaseous curing agent, vacuum infusion of curing agent, and the like. Further, this arrangement assures that leakage of pressure fluid from within the body 19 will be precluded even though for some reason bonding of the material of the body to the flange and the stem on the surfaces thereof other than the head-confronting surface may fail or even be omitted. A pressure fluid duct such as an air hose or hydraulic hose 31 may be attached by means of a suitable coupling 32 to the outwardly projecting portion of the stem 23.

Where the conduit or duct connecting the device 10 with a source of fluid pressure comprises a pipe 33 (FIG. 3) a combination attachment and coupling nut 34 may be used which is of sufficient length to engage the threaded outer end portion of the stem 23 and secure it to the core box 11 in the same manner as the nut 30 of FIGS. 1 and 2, but which is of sufficient length to receive a threaded end portion of the pipe 33.

Where the surface of the core box cavity 12 is contoured in the area where the device 10 is installed, as shown in FIG. 3, the thrust surface of the head 21 is correspondingly contoured. Contouring of such head surface may be effected after installation by a suitable grinding operation, or such surface may be preformed to the desired contour.

A modified thrusting device 10' (FIG. 4) accomplishing the same results includes a carrier 35 of a relatively rigid material such as metal or rigid molded or machined plastic which is dimensioned to be received in a complementary recess 37 in a supporting member 38 which may be a core box or any other member with which the device is used. An elastomeric body 39 fills a recess 40 opening from the face of the retainer 35 which is in a plane with the face of the supporting member 38 about the recess 37 and has a crown 41 the outer surface of which is normally in such plane. About its perimeter, the body 39 is bonded to the wall surfaces of the recess 40 and including desirably an interlocking undercut 42 in the wall of the recess. Although normally the inner face of the body 39 confrontingly contacts the bottom or root surface defining the recess 40, such inner face is unattached and thus free to move away from the bottom of the recess as shown in dash outline so that the crown 41 will bulge from the normal plane for ejection or other thrusting purposes. Attachment of the device 10' to the member 38 may be effected in similar fashion as described for FIGS. 1–3, and for this purpose a stem 43 projects from the inner end of the retainer 35 and has an axial passage 44 communicating with the bottom of the recess 40 for pressurizing the body 39 by a pressurizing medium introduced through the passage. Projection of the stem 43 from the recess 37 is through a bore 45 in the member 38. Sealing against leakage through the bore 45 may be effected as by means of a sealing gasket 47 or other sealing means interposed between the members 35 and 38.

Although pressure fluid actuation of the thrusting device has the advantage of minimizing mechanism and more particularly operating mechanism, where use of pressure fluid is not feasible or it is preferred to employ mechanical actuating means, an arrangement such as depicted in FIG. 5 may be utilized wherein a pressurizable elastomeric thrusting device 10″ includes an elastomeric body 48 mounted in filling relation within a complementary recess 49 in a supporting member 50. Projecting from the back of the body 48 is a rigid stem 50 having on its body engaging end a lateral securing and clamping flange 51 within the inner end portion of and spaced a limited distance from the inner end surface of the body 48 with the stem projecting through a bore 52 in the member 50 and secured as by means of a nut 53. Means for effecting thrusting projection of a head 54 on the elastomeric body 48 relative to the retainer 50, 51 comprise a plunger 55 located between the flange 51 and the head 54 and having an actuating rod 57 which is slidably reciprocable through an axial passage bore 58 in the stem 50. In a desirable form, the plunger 55 may be, as shown, a large radius mushroom convexity, substantially similar to the projected outer surface shape of the crown 54 when the plunger has been actuated to pressurize the crown portion of the body 48, as indicated in dash outline in FIG. 5. For this purpose, of course, the plunger 55 is freely movable relative to the flange 51. In addition, in order to enable efficient stretching of the crown portion 54 during thrusting operation, the driving surface of the plunger 55 is desirably unattached with respect to the opposing surface of the body 48 although in direct contact therewith. This permits a stretching relative movement of the opposing surface of the body 48 without strain during the pressurizing action.

In FIG. 6 is depicted utilization of a thrusting device 10‴ for restraining motion, and more particularly as a holding or stopping brake between two relatively movable members 59 and 60. Relative movement of the members 59 and 60 may be reciprocal, oscillatory, rotary or a combination thereof, but in at least one relative disposition of the members they are relatively close together. Merely by way of example, the member 59 is depicted as a portion of an apparatus, machine, vehicle, or like, frame while the member 60 is depicted as a cylindrical member which may be a shaft, bar, rod, wheel, and the like. In this instance the thrusting device 10‴ is mounted on the member 59 and includes a rigid retainer 61 mounted on the member 59 in confronting relation to the member 60 and having a stem portion 62 which extends through the member 59 and has threaded thereon a securing nut 63. Affixed to the retainer 61 is a pressurizable elastomeric body 64 the crown of the head surface of which opposes the member 60 and is pressurizable to thrust out its normal plane to apply pressure against the member 60 and thereby restrain relative movement of the members 59 and 60. Operation of the thrusting device may be either by means of pressure fluid substantially as in the devices 10 or 10′ or mechanically as in respect to the device 10″.

In all forms of the invention it will be observed that the elastomeric thrusting body head portion is self-returning. That is, after pressurization, either by fluid or mechanically, the stretched thrusting head of the device automatically and because of its elasticity returns to at least substantially the normal plane of the thrusting head pressing surface.

It will be understood that variations and modifications may be effected without departing from the spirit and scope of the novel concepts of this invention.

I claim as my invention:

1. In combination with a member having a recess therein and adapted to have a second member relatively movable in confronting relation thereto and to said recess:
   a rigid retainer secured within said recess and having a surface which faces toward the opening from the recess;
   an elastomeric body affixed to said retainer and thereby retained in said recess;
   said elastomeric body having a head portion exposed at the opening from the recess and normally lying adjacent to but separably movable away from said surface of said retainer; and
   means for effecting movement of said head portion away from said surface for elastic thrusting movement of said head portion outwardly relative to said recess and toward the second member.

2. A combination according to claim 1, said means for movement of said head portion away from said surface comprising a member having a passage communicating through said surface to said head portion and adapted to be attached to a source of fluid under pressure.

3. A combination according to claim 2, said passage member comprising a tubular stem rigid with said retainer, and means for attaching said stem to said supporting member.

4. A combination according to claim 3, said rigid retainer comprising a flange embedded in said elastomeric body and clamping a portion of said body to said supporting member in said recess.

5. A combination according to claim 1, said supporting member having a surface about said recess, said head portion having an outer surface lying normally within the plane of said supporting member surface and moving out of said plane when the head portion is moved away from said retainer surface.

6. A combination according to claim 1, said retainer comprising a generally cup-shaped member seated in said recess and having a cavity within which said elastomeric body is received and with said elastomeric body bonded to said cup-shaped member except at said surface of the retainer which is in the bottom of said cavity, said means for movement of said head portion away from said surface being operative through the bottom of the cavity.

7. A combination according to claim 6, said means for movement of said head portion away from said surface comprising a hollow tubular stem fixed in said retainer and adapted for delivering pressure fluid to said retainer surface for effecting said thrusting movement of said head portion.

8. A combination according to claim 1, said means for movement of said head portion away from said surface comprising a plunger interposed between said surface and said head portion, and an actuating member extending from said plunger for movement of said plunger away from said surface to effect said thrusting movement of said head portion.

9. A combination according to claim 1, wherein said means for effecting movement of said head portion comprises a plunger interposed between said surface and said head portion.

10. A combination according to claim 9, including a stem on said plunger, and a tubular extension from said retainer guiding said stem.

11. A combination according to claim 1, said retainer comprising a flange embedded in said body and having a hollow stem extending therefrom and from said body in the opposite direction from said surface and having a passage in the stem communicating through said flange to said surface for said means for movement of said head portion away from said surface.

12. A combination according to claim 11, said stem having means thereon for attachment thereto of a pressure fluid duct to convey pressure fluid through said stem passage to act between said surface and said head.

13. In combination with a member having a recess therein and adapted to have a second member relatively movable in confronting relation thereto and to said recess:
- a rigid retainer secured within said recess and having a surface which faces toward the opening from the recess;
- an elastomeric body affixed to said retainer and thereby retained in said recess;
- said elastomeric body having a head portion exposed at the opening from the recess and normally lying adjacent to but separably movable away from said surface of said retainer;
- means for effecting movement of said head portion away from said surface for elastic thrusting movement of said head portion outwardly relative to said recess and toward the second member;
- said retainer comprising a generally cup-shaped member mounted in said recess and having a cavity therein;
- said surface being in the bottom of said cavity;
- said elastomeric body being fixed in said cavity except where it confronts said surface;
- said means for movement of said head portion away from said surface including a passage communicating through the bottom of said cavity and through a bottom wall in said recess for delivery of pressure fluid to the area between said surface and said head portion; and
- a seal between said cup-shaped member and said bottom wall.

14. A combination according to claim 13, wherein said passage is provided a hollow stem threadedly engaged with said member through the bottom of said cavity, said bottom wall having a bore therein accommodating said stem.

References Cited

UNITED STATES PATENTS

| | | | |
|---|---|---|---|
| 2,070,960 | 9/1967 | Phillips | 254—93 |
| 2,480,477 | 8/1949 | Jones | 25—120 |
| 2,843,038 | 7/1958 | Manspeaker | 249—66 |
| 3,225,396 | 12/1965 | Hansberg | 164—202 |
| 3,238,576 | 3/1966 | Taccone | 164—180 |
| 3,374,983 | 3/1968 | Garretson et al. | 18—2 X |

FOREIGN PATENTS

| | | |
|---|---|---|
| 878,100 | 6/1953 | Germany. |

LESTER M. SWINGLE, Primary Examiner

D. R. MELTON, Assistant Examiner

U.S. Cl. X.R.

164—200; 269—22